US009568756B2

(12) United States Patent
Watanabe

(10) Patent No.: US 9,568,756 B2
(45) Date of Patent: Feb. 14, 2017

(54) DISPLAY DEVICE

(71) Applicant: Sharp Kabushiki Kaisha, Osaka-shi, Osaka (JP)

(72) Inventor: Hisashi Watanabe, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 105 days.

(21) Appl. No.: 14/411,121

(22) PCT Filed: Jun. 20, 2013

(86) PCT No.: PCT/JP2013/066910
§ 371 (c)(1),
(2) Date: Dec. 24, 2014

(87) PCT Pub. No.: WO2014/002859
PCT Pub. Date: Jan. 3, 2014

(65) Prior Publication Data
US 2015/0153610 A1 Jun. 4, 2015

(30) Foreign Application Priority Data

Jun. 26, 2012 (JP) ................................ 2012-143395

(51) Int. Cl.
*G02F 1/1333* (2006.01)
*G02F 1/1335* (2006.01)
(Continued)

(52) U.S. Cl.
CPC ... *G02F 1/133308* (2013.01); *G02F 1/133526* (2013.01); *G09F 9/00* (2013.01);
(Continued)

(58) Field of Classification Search
CPC .......... G02F 2001/13332; G02F 2001/133331; G02F 2001/133388; G02F 2001/133562
(Continued)

(56) References Cited

U.S. PATENT DOCUMENTS 6,927,908 B2  8/2005 Stark
7,443,463 B2  10/2008 Chang et al.
(Continued)

FOREIGN PATENT DOCUMENTS

JP  05-188873 A  7/1993
JP  2004-524551 A  8/2004
(Continued)

*Primary Examiner* — Hoan C Nguyen
(74) *Attorney, Agent, or Firm* — Keating & Bennett, LLP

(57) ABSTRACT

A display device, of which the frame is not easily visible in an edge portion, is provided.
This display device includes: a display panel having a display area and a frame area provided outside of the display area; a light-transmitting cover arranged closer to a viewer than the display panel is and including a lens portion that is arranged at a position corresponding to the boundary between the frame area and the display area of the display panel; and a housing including a lateral housing portion arranged to face the display panel's side surface. The outer side surface of the lateral housing portion is located in a space between a first plane which is parallel to a normal to the display panel's screen surface and which contacts with the outer end face of the lens portion of the light-transmitting cover and a second plane which defines an acute angle θ of 25 degrees or less with respect to the normal to the display panel's screen surface and which contacts with the surface of the lens portion.

15 Claims, 9 Drawing Sheets

(51) Int. Cl.
  *G09F 9/00*   (2006.01)
  *H04N 5/64*   (2006.01)
  *G09F 15/00*  (2006.01)
(52) U.S. Cl.
  CPC ........... *G09F 15/0012* (2013.01); *H04N 5/64* (2013.01); *G02F 2001/133314* (2013.01); *G02F 2001/133331* (2013.01)
(58) Field of Classification Search
  USPC .......................................................... 349/58
  See application file for complete search history.

(56) References Cited

U.S. PATENT DOCUMENTS

| | | | |
|---|---|---|---|
| 2004/0051944 A1* | 3/2004 | Stark | G02F 1/13336 359/448 |
| 2011/0109535 A1 | 5/2011 | Watanabe et al. | |
| 2011/0242686 A1 | 10/2011 | Watanabe | |
| 2011/0285934 A1 | 11/2011 | Watanabe | |
| 2011/0310488 A1* | 12/2011 | Tomotoshi | G02F 1/133308 359/601 |
| 2012/0069273 A1* | 3/2012 | Watanabe | G02B 5/0215 349/64 |
| 2012/0236483 A1* | 9/2012 | Watanabe | G02F 1/13336 361/679.01 |
| 2013/0242230 A1* | 9/2013 | Watanabe | G02F 1/133504 349/64 |
| 2015/0251943 A1* | 9/2015 | Wada | C03B 23/0307 428/130 |

FOREIGN PATENT DOCUMENTS

| | | |
|---|---|---|
| WO | 2009/157150 A1 | 12/2009 |
| WO | 2010/070871 A1 | 6/2010 |
| WO | 2010/089998 A1 | 8/2010 |

* cited by examiner

FIG.3
(a)
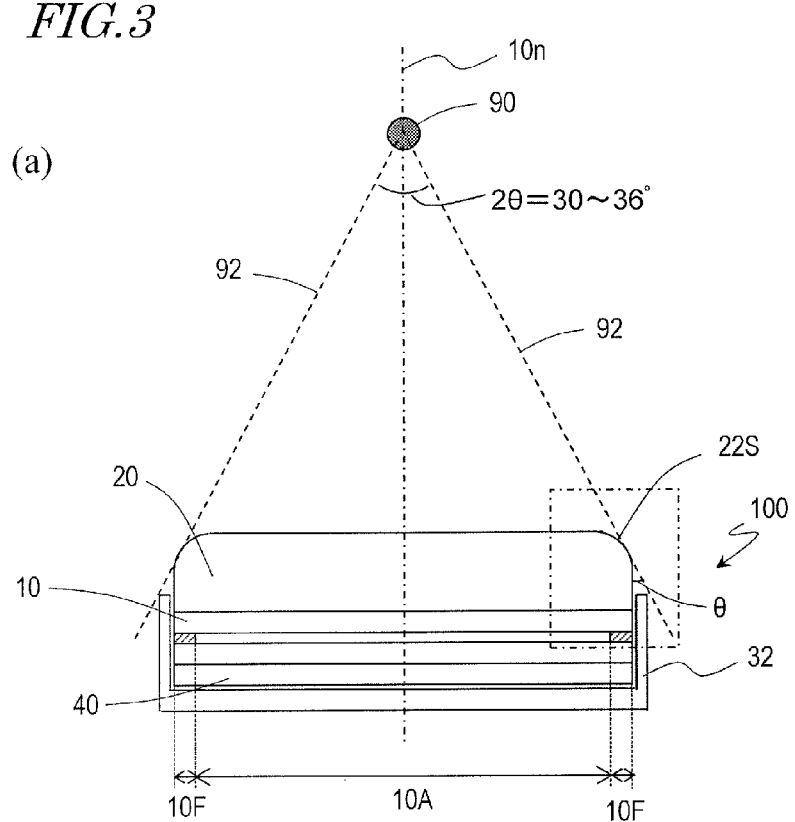
(b)
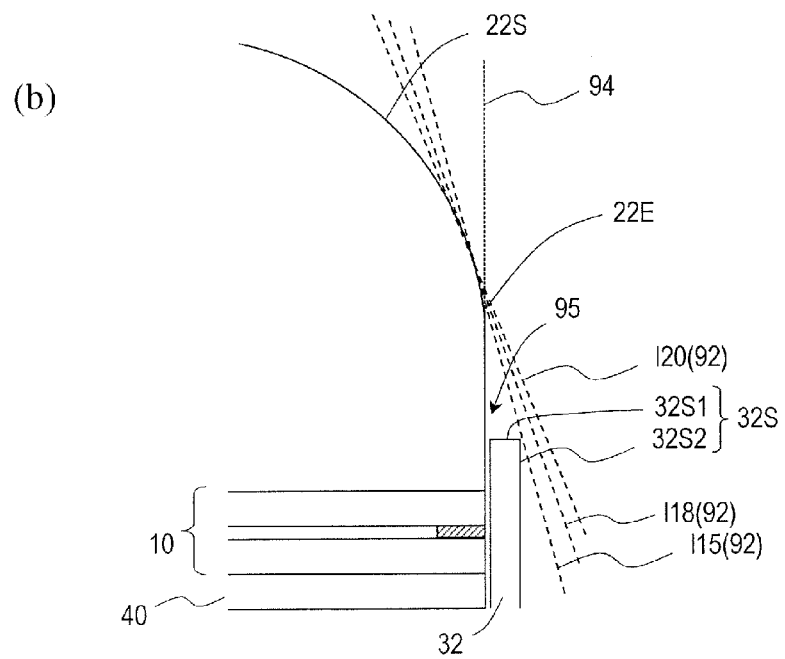

FIG.8
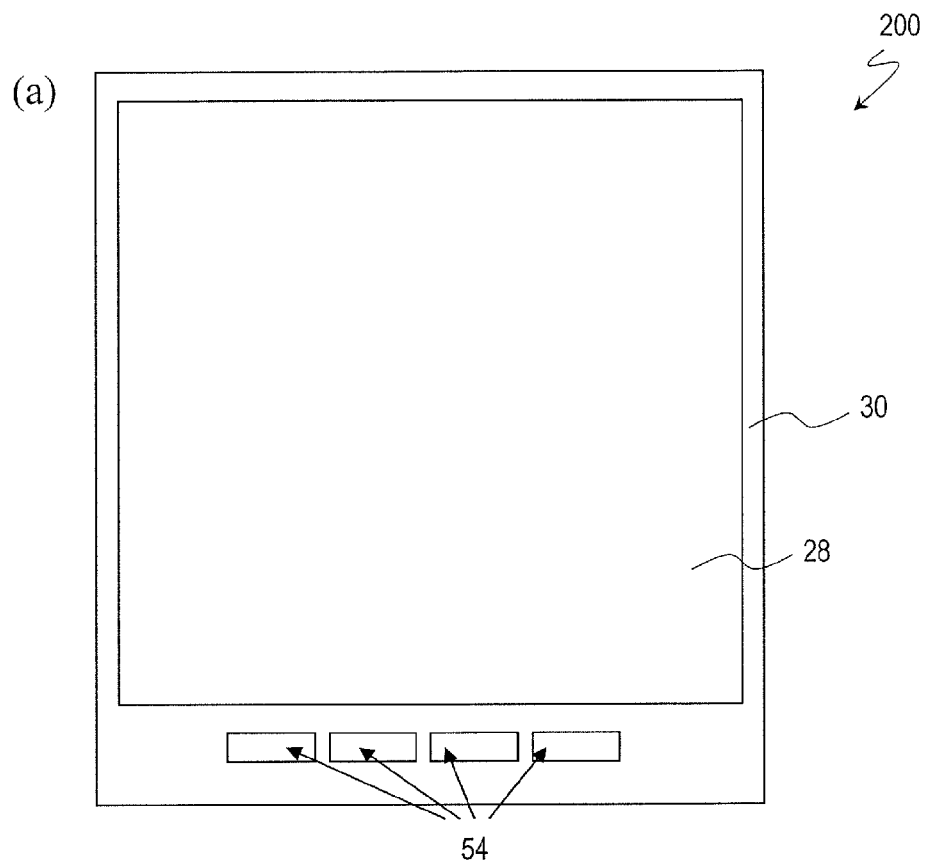
(a)
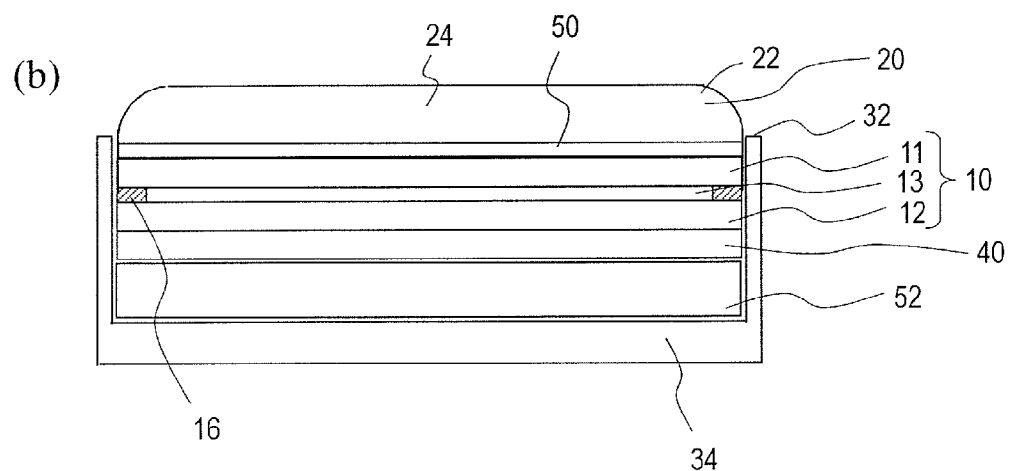
(b)

FIG.9
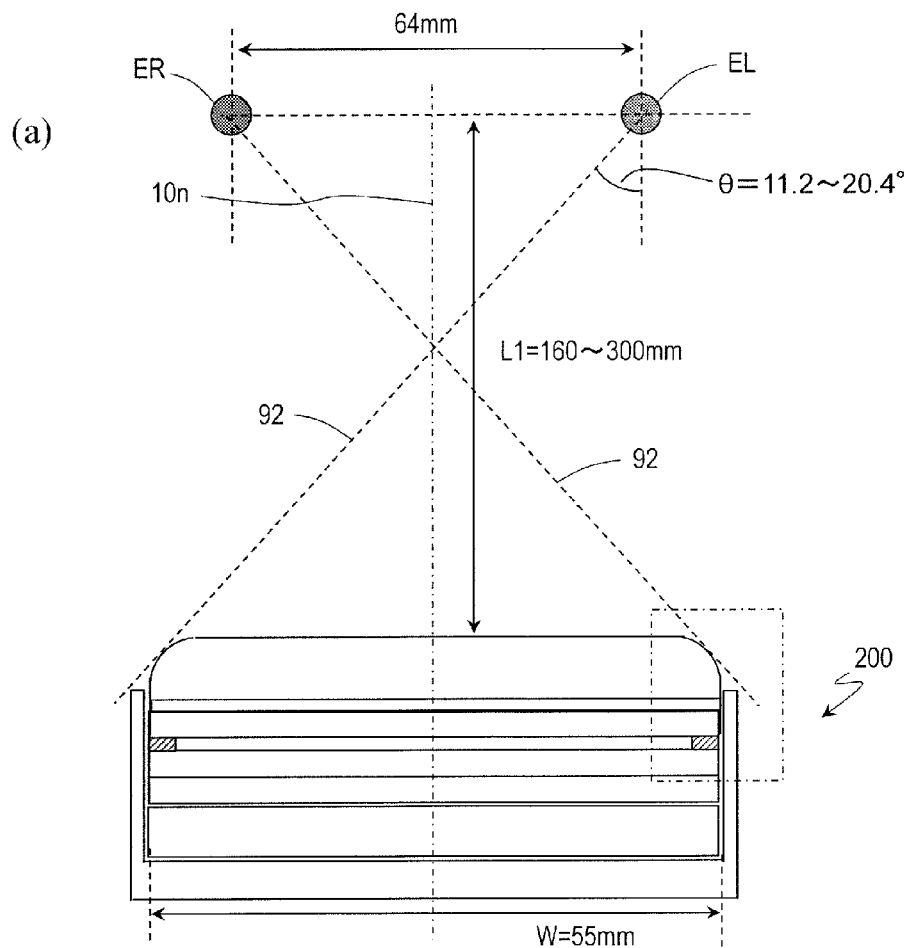
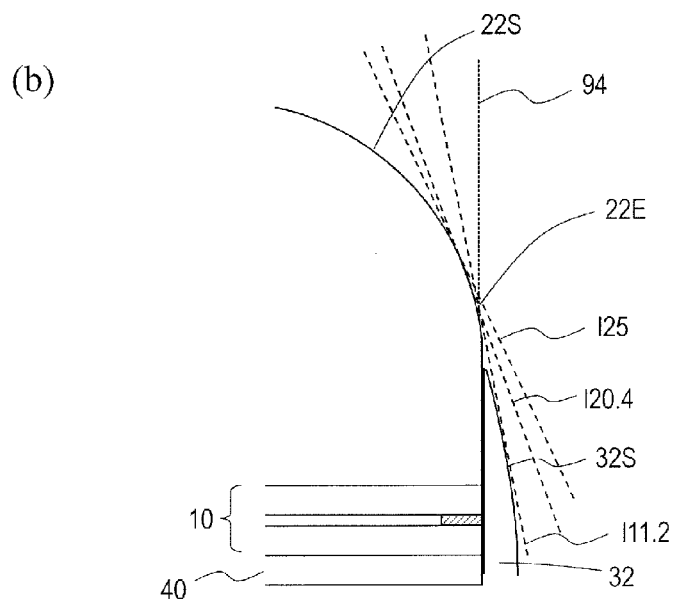

DISPLAY DEVICE

TECHNICAL FIELD

The present invention relates to a display device and more particularly relates to a display device with a light-transmitting cover.

BACKGROUND ART

A transmissive liquid crystal display device generally includes a liquid crystal display panel, a backlight unit, circuits and power supplies for supplying various kinds of electrical signals to the liquid crystal display panel, and a housing to house all of these components. The light emitted from the backlight unit is modulated on a pixel-by-pixel basis by the liquid crystal display panel, thereby conducting a display operation.

The liquid crystal display panel includes a display area (active area) in which a plurality of pixels are arranged and a frame area which surrounds the display area. In the display area, pixel electrodes, TFTs and other members are arranged and an image or video is displayed. In the frame area, on the other hand, arranged are a seal member to seal a liquid crystal material between the substrates, wiring connected to scan lines and signal lines, and terminals to be connected to an external driver circuit.

The frame area of the display panel is an area that does not contribute to a display operation, and therefore, decreases the planar area of the display area on the display screen of the panel. Also, in an arrangement in which a number of display devices are assembled densely together with no gaps left between them to form a single big screen (and which is sometimes called a "multi-display system"), the frame area is sensed to the viewer's eyes as a non-display area (black frame) representing the seams of the display device. Although the frame area has been narrowed year after year, it is difficult in principle to eliminate the frame area altogether.

Methods for making those seams less sensible to the eye in display devices which form a multi-display system have been studied in the related art. For example, Patent Documents Nos. 1 to 3 disclose a display device in which a light-transmitting cover is provided closer to the viewer than the display panel is. The end portion of the light-transmitting cover includes a curved portion which functions as a lens.

That curved portion (lens portion) of the light-transmitting cover is typically arranged to cover not only the frame area of the display panel but also a part of the display area near the frame area (which will be sometimes hereinafter referred to as a "peripheral display area"). Part of the light that has gone out of pixels that are arranged in the peripheral display area is refracted by the lens portion, and an enlarged image is also displayed in front of the frame area. As a result, it looks to the viewer's eye as if an image was being displayed on the frame area, too, thus providing an image, of which the seams are less sensible to the viewer's eye.

CITATION LIST

Patent Literature

Patent Document No. 1: Japanese Laid-Open Patent Publication No. 5-188873
Patent Document No. 2: PCT International Application Japanese National-Phase Publication No. 2004-524551 (corresponding to U.S. Pat. No. 6,927,908)
Patent Document No. 3: U.S. Pat. No. 7,443,463
Patent Document No. 4: PCT International Application Publication No. 2010/089998

SUMMARY OF INVENTION

Technical Problem

As described above, according to a known configuration, a light-transmitting cover including a lens portion at its end portion is arranged closer to the viewer than the display panel is in a display device for use to form a multi-display system. Such a configuration is often designed so that a portion of the housing arranged on the side surface of the display panel does not project outward from the end portion of the light-transmitting cover. The reason is that if the side surface portion of housing projected out of the end portion of the light-transmitting cover, no images could be displayed in that portion, thus expanding the non-display area between the display devices and making the seams more sensible to the viewer's eye.

That is why as disclosed in Patent Document No. 3, for example, a portion of the housing that covers the side surface of the display panel (which will be hereinafter referred to as a "lateral housing portion") often has its outer surface aligned with the end portion of the light-transmitting cover. With such a configuration adopted, a number of display devices are arranged densely together with no gaps left between them so that the respective end portions of the light-transmitting covers provided for the respective display devices contact with each other, thereby making the seams between the display devices less sensible to the viewer's eye.

Meanwhile, a display device which is supposed to be used by itself could have a configuration in which the outer surface of its lateral housing portion projects out of the end face of the light-transmitting cover.

The present inventors disclosed, in Patent Document No. 4, a technique for making the peripheral portions of (which will be sometimes hereinafter referred to as a "frame") a display device less sensible to the viewer's eye in not only the frame area of the display panel but also the lateral housing portion arranged beside the frame area as well.

According to the technique disclosed in Patent Document No. 4, a light-transmitting cover with a lens portion is arranged closer to the viewer than the display panel is, and the lateral housing portion arranged on the side surface of the display panel is made of a material with a light-transmitting property, thereby making the frame on the peripheral area of the display device less sensible to the viewer's eye. The lateral housing portion arranged on the side surface of the display panel contributes to preventing dust from entering the display device and increasing its impact resistance.

In the display device disclosed in Patent Document No. 4, however, if the lateral housing portion arranged on the side surface of the display panel does not have a high degree of translucency, then that portion could be sensed by the viewer. Thus, such a configuration in which a lateral housing portion is arranged on the side surface of a panel should make the peripheral portion of the display device much less sensible to the viewer's eye, which is a problem that still needs to be overcome.

The present inventors perfected our invention in order to overcome such a problem by providing a display device, of which the frame, as well as the housing, is not easily sensible to the viewer's eye.

Solution to Problem

A display device according to an embodiment of the present invention includes: a display panel having a display area and a frame area which is provided outside of the display area; a light-transmitting cover which is arranged closer to a viewer than the display panel is and which includes a lens portion that is arranged at a position corresponding to the boundary between the frame area and the display area of the display panel; and a housing including a lateral housing portion which is arranged to face the display panel's side surface. The outer side surface of the lateral housing portion is located in a space between a first plane which is parallel to a normal to the display panel's screen surface and which contacts with the outer end face of the lens portion of the light-transmitting cover and a second plane which defines an acute angle θ of 25 degrees or less with respect to the normal to the display panel's screen surface and which contacts with the surface of the lens portion.

In one embodiment, the display panel has a diagonal size of 19 inches or less and the acute angle θ is equal to or smaller than 20.4 degrees.

In one embodiment, the acute angle θ is equal to or smaller than 11.2 degrees.

In one embodiment, the display panel has a diagonal size of 19 inches or more and the acute angle θ is equal to or smaller than 20 degrees.

In one embodiment, the acute angle θ is equal to or smaller than 18 degrees.

In one embodiment, the acute angle θ is equal to or smaller than 15 degrees.

In one embodiment, the acute angle θ is equal to or larger than 1.8 degrees.

In one embodiment, the lateral housing portion has a thickness of 0.1 mm or more.

In one embodiment, the distance from the surface of a display medium of the display panel to the surface of the light-transmitting cover is set to be 2.7 to 4.6 times as large as the width of the frame area.

In one embodiment, the principal surface of the outer side surface of the lateral housing portion is formed to define an acute point angle θ2 with respect to the first plane and the point angle θ2 is equal to or smaller than 25 degrees.

In one embodiment, the outer side surface of the lateral housing portion has a reflectance of 30% to 70%.

In one embodiment, the outer side surface of the lateral housing portion has an achromatic color.

In one embodiment, the display device further includes a cushioning member which is provided between the outer side surface of the lateral housing portion and the side surface of the display panel.

In one embodiment, the cushioning member is made of a gel material.

In one embodiment, the lateral housing portion is made of a material with no light-transmitting property.

A display device according to another embodiment of the present invention includes: a display panel having a display area and a frame area which is provided outside of the display area; a light-transmitting cover which is arranged closer to a viewer than the display panel is and which includes a lens portion that is arranged at a position corresponding to the boundary between the frame area and the display area of the display panel; and a housing including a lateral housing portion which is arranged to face the display panel's side surface. The outer side surface of the lateral housing portion is located in a space between a first plane which is parallel to a normal to the display panel's screen surface and which contacts with the outer end face of the lens portion of the light-transmitting cover and a second plane which defines an acute angle θ with respect to the normal to the display panel's screen surface and which contacts with the surface of the lens portion. If the width of the display panel is W1 mm, the acute angle θ satisfies the following equation: $\theta = \arctan((Ed+W1)/2L)$, where $160 \leq L \leq 300$ and $56 \leq Ed \leq 75$.

Advantageous Effects of Invention

A display device according to an embodiment of the present invention can make the frame less sensible to the viewer's eye.

BRIEF DESCRIPTION OF DRAWINGS

FIG. 3 Shows the relative position of the user with respect to the display device, wherein (a) illustrates the overall arrangement and (b) is a cross-sectional view illustrating, on a larger scale, the region surrounded with the one-dot chain in (a).

FIG. 8 Illustrates a configuration for a display device according to a second embodiment of the present invention, wherein (a) is a plan view and (b) is a cross-sectional view.

FIG. 9 Shows the relative positions of the user's eyes with respect to the display device, wherein (a) illustrates the overall arrangement and (b) is a cross-sectional view illustrating, on a larger scale, the region surrounded with the one-dot chain in (a).

DESCRIPTION OF EMBODIMENTS

Figure 1:
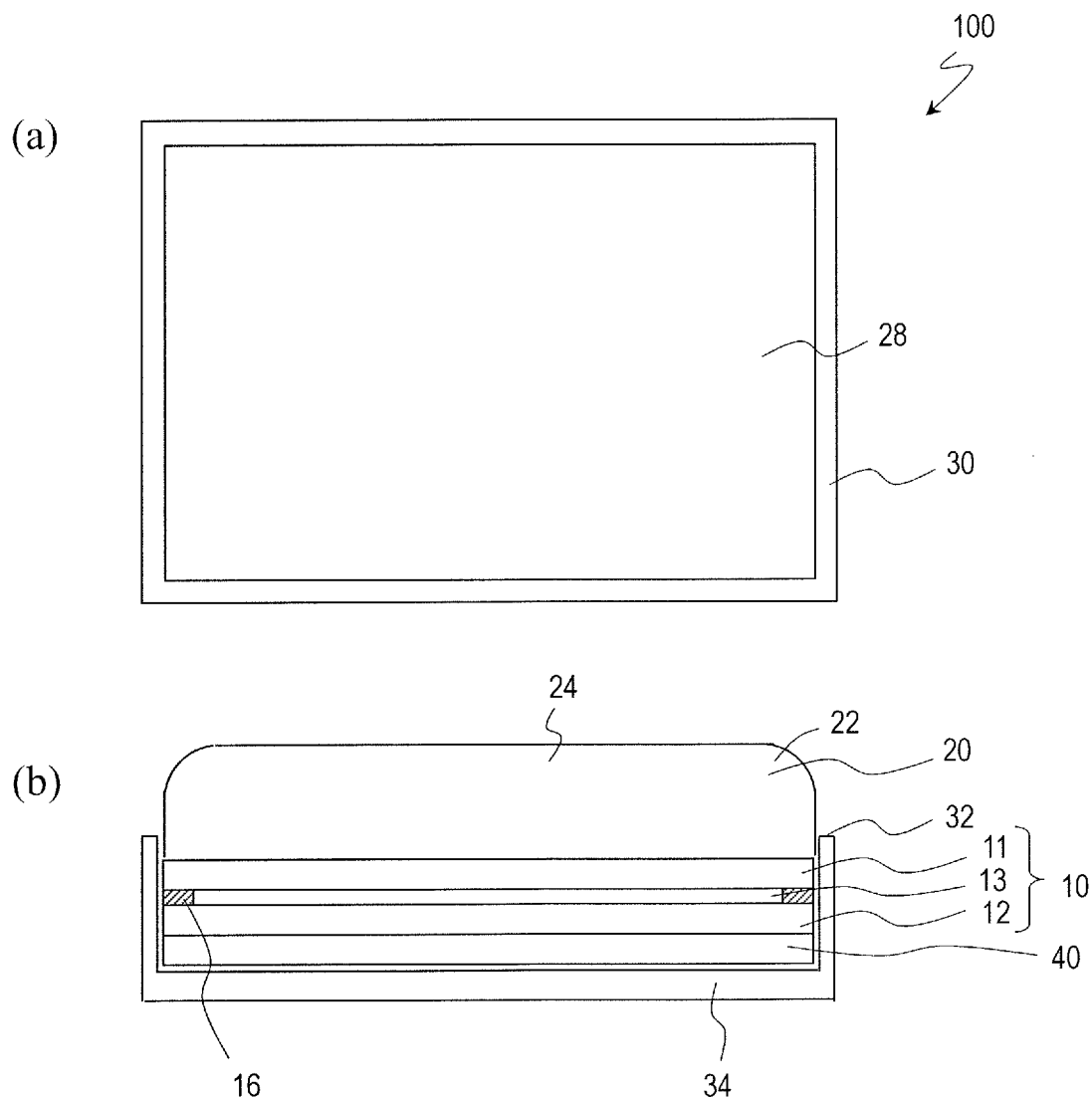
FIG. 1 Illustrates a configuration for a display device according to a first embodiment of the present invention, wherein (a) is a plan view and (b) is a cross-sectional view.

First of all, it will be outlined what a general idea of a display device according to an embodiment of the present invention is.

Paying special attention to the fact that in a display device for use in a TV set, a smartphone and other electronic devices, the relative position of the user (more exactly, the relative positions of his or her eyes) with respect to the display device in operation is almost fixed, the present inventors carried out researches to find a configuration that would make the lateral housing portion less sensible to his or her eyes under this condition. As a result, the present inventors confirmed that as long as the lateral housing portion was arranged in a space that would be a blind spot for the user who was located at his or her normal viewing position to say the least, even if the frame was more or less visible from a different viewing position, such a display device would generally work as if there were no frames for him or her.

In this case, the light-transmitting cover is arranged at the front end of the display panel to have a predetermined thickness there. That is why when arranged so as to be hidden behind the light-transmitting cover as viewed from the viewer's position, the lateral housing portion could be made less sensible to the viewer even if the portion is located outside of the end face of the lens.

More specifically, a plane which contacts with, and defines a predetermined angle with respect to, the surface of the lens portion of the light-transmitting cover is defined as a virtual viewing plane (which will be sometimes hereinafter referred to as a "second plane"). And the lateral housing portion is arranged so as to be located closer to the display panel than this virtual viewing plane is (i.e., located in the blind spot space). The present inventors discovered that by adopting such an arrangement, the lateral housing portion itself was not easily visible for the user to make him or her feel as if there were no frames at all. The angle defined by this virtual viewing plane may be determined by a general viewing distance when the user operates the display device.

Also, compared to the configuration in which the outer side surface of the lateral housing portion is aligned with the end face of the lens portion of the light-transmitting cover (e.g., the configuration disclosed in Patent Document No. 3), the area in which an image needs to be magnified by the lens portion before being displayed can be narrowed according to this configuration. That is to say, according to this configuration, there is no need to arrange the lens portion over the lateral housing portion and the lens portion just needs to be located over the frame area of the display panel. As a result, the lens portion can be designed to have a relatively small size. In addition, the thickness of the light-transmitting cover can be reduced, too.

Thus, in a display device according to such an embodiment of the present invention described above, display light coming from the display panel is emitted through the lens portion in the peripheral area of the display device and the lateral housing portion is arranged in the blind spot space created by the lens portion. Consequently, the user can enjoy the image displayed without sensing the presence of the frame and can feel as if there was only the display screen up in the air. A display device according to an embodiment of the present invention can create such a totally new viewing experience for the viewer.

Embodiments of the present invention will now be described with reference to the accompanying drawings.

(Embodiment 1)

A relatively large, stationary (fixed) display device to be used as a TV monitor, for example, will be described as a display device according to a first embodiment. The display device of this embodiment typically includes a display panel with a diagonal size of at least 19 inches.

FIGS. 1(a) and 1(b) illustrate a configuration for a display device 100 according to this first embodiment. This display device 100 includes a display panel 10, a backlight 40 which is arranged behind the display panel 10, and a light-transmitting cover 20 which is arranged closer to the viewer than the display panel 10 is. The display panel 10 and backlight 40 are housed in, and held by, a housing 30. The display panel 10 is a transmission type and conducts a display operation on a display screen 28 by getting light coming from the backlight 40 modulated by the display panel 10.

The backlight 40 may be an edge light type backlight including a light source such as an LED, a light guiding plate, and a diffuser or a direct type (surface emitting type). In addition, a circuit board to drive the display device 100 may be further arranged behind the backlight 40.

In this embodiment, the display panel 10 is a liquid crystal panel and has a configuration in which a liquid crystal layer 13 is interposed between a TFT substrate 12 and a counter substrate 11. The counter substrate 11 and TFT substrate 12 each generally include light-transmitting glass substrate. These substrates are bonded together with a seal member 16 which has been applied like a frame onto their peripheral area. And a liquid crystal material is injected into the gap surrounded with the seal member 16, thereby forming the liquid crystal layer 13. Optionally, a polarizer (not shown) or an optical film layer such as a phase difference film (not shown, either) may be attached onto the outer surface of the counter substrate 11 and TFT substrate 12.

Figure 2:
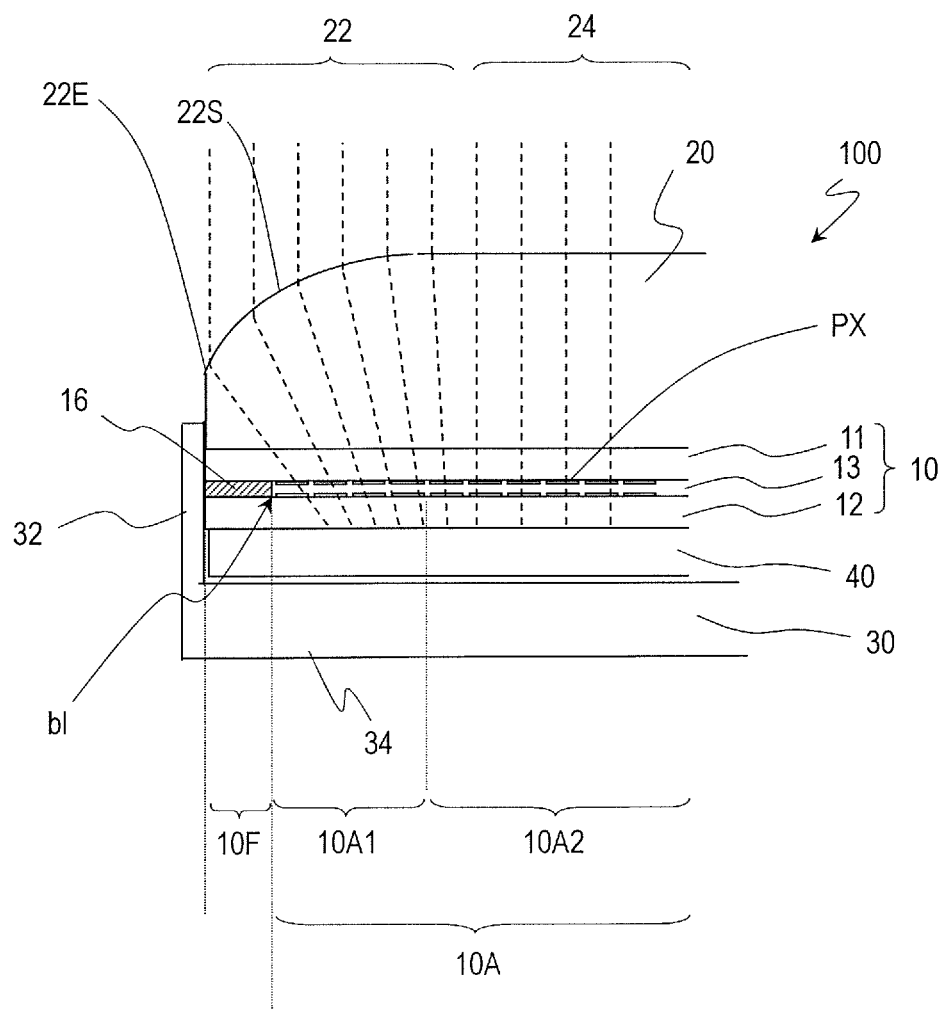
FIG. 2 A cross-sectional view illustrating, on a larger scale, an end portion on one side of the display device shown in FIG. 1.

The display panel 10 has a rectangular planar shape. Also, as shown in FIG. 2, the display panel 10 has a display area 10A and a frame area 10F which is provided as a non-display area outside of the display area 10A. In the display area 10A, a plurality of pixels PX are arranged in columns and rows to form a matrix pattern. On the other hand, the seal member 16, wiring, and other members are arranged in the frame area 10F. The display area 10A may be divided into a peripheral display area 10A1 which is adjacent to the frame area 10F and a central display area 10A2 that is the rest of the display area other than the peripheral display area 10A1.

The display device 100 according to an embodiment of the present invention does not have to be a liquid crystal display device but may also be a display device of any other type as well. For example, a display device which uses any other display method such as an organic EL panel, a PDP (plasma display panel), an FED (field emission display) panel, an electrophoretic display panel, or a display panel operating in the electro-wetting method may be used as well. When either a self-emitting display panel or a reflective display panel is used, the display device does not have to include the backlight 40 described above.

The light-transmitting cover 20 arranged in front of the display panel 10 has a planar shape corresponding to that of the substrate and may be made of a light-transmitting material such as a transparent resin material (e.g., an acrylic material or a polycarbonate material) or glass. The light-transmitting cover 20 is comprised of a flat plate portion 24 which covers the display area almost entirely and a lens portion 22 provided at the end portion of the flat plate portion 24. In this embodiment, the viewer-side surface 22S of the lens portion 22 is a curved surface (lens surface). However, the lens portion 22 may also have any other shape. For example, its back surface (i.e., the surface opposite from the viewer-side surface) may also be a curved surface.

The lens portion 22 of the light-transmitting cover is arranged so as to overlap with an area covering the frame area 10F of the display panel 10 and the peripheral display area 10A1 in the display area 10A that is adjacent to the frame area 10F. In other words, the lens portion 22 is arranged over the boundary b1 between the frame area 10F and the peripheral display area 10A1. In this case, the boundary b1 between the peripheral display area 10A1 and the frame area 10F has been defined to run along the respective sides of the display panel 10. Likewise, the lens portion 22 of the light-transmitting cover has also been defined to run along the boundary b1 on the respective sides.

By getting the light going through the peripheral display area 10A1 refracted by the lens portion 22, an image in the peripheral display area 10A1 on the display panel 10 can be magnified through the light-transmitting cover 20 and displayed as an enlarged image in the area covering the peripheral display area 10A1 and the frame area 10F. As a result, the frame area 10F becomes much less sensible to the viewer's eye.

The shape of the lens surface 22S of the lens portion 22 will be described below. For example, the shape of the lens surface 22S may form part of a circular cylindrical side surface. In that case, on a cross section which intersects at right angles with the boundary b1 (i.e., on the cross section illustrated in FIG. 2), the lens surface 22S defines a circular arc. Alternatively, the lens surface 22S may also define a curve represented by an aspheric equation or may even define a free-form curve as well.

The aspheric equation defining the lens surface 22S may be the following equation which uses the radius of curvature R1 (or curvature c) and an aspheric coefficient (Conic constant) k:

Aspheric Equation: $f(x)=Y-cx^2/(1+(1-(1+k)c^2x^2)^{1/2})$ where c=1/R1, x is the horizontal distance from the top of the lens (i.e., from the boundary between the lens portion 22 and the flat plate portion 24) and Y is the height at the top of the lens (i.e., the thickness of the light-transmitting cover in the flat plate portion 24). The radius of curvature R1 and Conic constant k are set appropriately according to the width of the frame area 10F.

The shape of the lens surface 22S is described in detail in PCT International Application Publications No. 2009/157150 and No. 2010/070871, the entire disclosures of which are hereby incorporated by reference. Any of the lens surface shapes disclosed in these documents may also be adopted in the embodiments of the present invention.

At the corners of the display panel 10, the shape of the lens portion 22 suitably forms part of a solid of revolution, for example. In this description, the "solid of revolution" refers herein to a solid figure obtained by rotating a plane figure 360 degrees around a line which is drawn on the same plane as the plane figure.

The housing 30 of the display device 100 includes a lateral housing portion 32 which is arranged to face (or cover) the side surface of the display panel 10 and a bottom housing portion 34 which is arranged behind the backlight 40 (or the display panel 10). As shown in FIG. 2, the lateral housing portion 32 may be arranged to cover partially the end portion 22E of the lens portion 22.

In this embodiment, the lateral housing portion 32 and the bottom housing portion 34 have been formed integrally out of a magnesium alloy, for example. However, part or all of the housing 30 may be made of various materials, examples of which include iron, an ferro-alloy such as stainless steel, an aluminum alloy, a magnesium alloy, a carbon fiber and a resin material. The lateral housing portion 32 and the bottom housing portion 34 do not have to be formed integrally but may also be formed separately from each other.

This housing 30 can not only prevent dust from entering the display panel 10 from outside of the panel but also reduce the impact applied externally. The housing 30 is secured to the side surface of the display panel 10 with an adhesive tape or screws. Optionally, the bottom housing portion 34 may be fixed onto the back surface of the backlight 40, too.

Before the arrangement of the lateral housing portion 32 is described in more detail, it will be described first where the user (i.e., viewer) is supposed to be located with respect to the display device 100 of this embodiment.

The following Table 1 summarizes appropriate viewing distances associated with respective screen sizes of general TV sets.

TABLE 1

Standard best viewing distances associated with respective screen sizes of LCD TVs

| Size | Screen height | Viewing distance |
|---|---|---|
| 32 V | about 39 cm | about 1.2 m |
| 40 V | about 50 cm | about 1.5 m |
| 46 V | about 57 cm | about 1.7 m |
| 52 V | about 65 cm | about 1.9 m |
| 60 V | about 75 cm | about 2.2 m |
| 70 V | about 87 cm | about 2.6 m |

They say that the best viewing distance when a viewer is watching TV is three times as large as its screen height. This data was collected based on subjective evaluations and is regarded as a distance at which the viewer can watch TV most comfortably almost without feeling any eyestrain. In this case, if the viewing angle (in horizontal direction) is calculated based on the viewing distance that has been obtained by tripling the screen height, the viewing angle will be approximately 33 degrees at every screen size.

The same opinion is stated in the standard that was set by THX Ltd., which proposes a recommended relation between the viewing distance and the screen size at a home theater. When the viewer is watching video of high-definition quality, the viewing distance and the screen size are suitably selected so that the lateral width of the screen falls within the viewer's (horizontal) viewing angle of 36 degrees. On the other hand, when the viewer is watching video of standard quality, the lateral width of the screen suitably falls within the viewing angle of 30 degrees.

Thus, it can be said that when the viewer is viewing video on the display device, the right and left ends of the display device are suitably located in the vicinity of a plane which is defined by viewing angles of 30 to 36 degrees (that is a virtual viewing plane). If the screen size is 60 inches, the viewing angles of 30 to 36 degrees correspond to viewing distances of 2.1 to 2.4 m.

FIG. 3(a) shows the relative position of the user (viewer) 90 with respect to the display device 100. Supposing the user 90 is viewing from the position defined above, a plane 92 which contacts with the lens surface 22S of the light-transmitting cover 20 and which defines an angle 2θ of 30 to 36 degrees with respect to a normal 10n to the display panel 10 can be defined as a virtual viewing plane. And the space which is located outside of the side surface of the display panel 10 and light-transmitting cover 20 and inside of that virtual viewing plane 92 (closer to the display panel 10) is a so-called "blind spot" space. That is why to make the lateral housing portion 32 arranged on the side surface of the display panel 10 hardly sensible to the viewer, the lateral housing portion 32 needs to be located in that blind spot space.

The virtual viewing plane 92 described above is a plane which defines a predetermined acute angle θ with respect to the normal 10n to the panel screen (which will be hereinafter referred to as a "panel normal 10n") and which contacts with the lens surface 22S of the light-transmitting cover 20. In the cross section shown in FIG. 3, this virtual viewing plane 92 defines a tangent with respect to the curve (such as a circular arc) drawn by the lens surface 22S. By using the angle θ defined by this tangent with respect to the panel normal 10n, the range in which the lateral housing portion 32 needs to be arranged can be defined. Specifically, the range can be defined in the following manner.

In the case of a display device with a screen size of 60 inches, the user 90 will view the front surface of the light-transmitting cover 20 from a distance of approximately 2.1 to 2.4 m along the normal 10n that passes through the center of the panel within an angular range 2θ (viewing angle range) of approximately 30 to 36 degrees. Likewise, even in a display device with a different screen size, the user is also supposed to view from such a distance within the same viewing angle range of approximately 30 to 36 degrees.

That is why the lateral housing portion 32 needs to be arranged so as not to go over any of the tangents 115 to 118 which contact with the lens surface 22s defining a curve and which define a tilt angle θ of 15 to 18 degrees in the cross section of the panel as shown in FIG. 3(b). If the screen size is 60 inches and if θ is set to be 15 degrees, the panel will look as if there were no frames when the viewing distance is shorter than approximately 2.4 m. On the other hand, if θ is set to be 18 degrees, the panel will look as if there were no frames when the viewing distance is shorter than approximately 2.1 m. That is why the angular range of the acute angle θ is suitably at most 18 degrees and most suitably 15 degrees or less. Nevertheless, the present inventors confirmed that if θ was equal to or smaller than approximately 20 degrees, the frames would be barely sensible to the viewer who is watching TV under an ordinary condition but not to an annoying degree. That is why in the display device of this embodiment, a preferred range of the acute angle θ is equal to or smaller than approximately 20 degrees but more than 0 degrees.

The lateral housing portion 32 is arranged so as to be located closer to the display panel 10 than the virtual viewing plane 92 defined by θ=approximately 20 degrees (i.e., the plane defined by the tangent 120) is and to cover the side surface of the display panel 10. That is to say, according to this embodiment, the outer side surface 32S of the lateral housing portion 32 is located in the space 95 between a plane 94 which contacts with the outer end face 22E of the lens portion 22 and which is parallel to the panel normal 10n (which will be hereinafter referred to as a "lens-end perpendicular plane" or "first plane") and the plane 92 that defines an acute angle θ of 20 degrees or less with respect to the panel normal and that contacts with the lens surface 22S (i.e., the virtual viewing plane or a second plane). Contrarily, if the outer side surface 32S of the lateral housing portion 32 were located outside of the virtual viewing plane 92 defined by θ=20 degrees, then part of the lateral housing portion 32 would be sensible as a frame to an annoying degree to the user who is viewing from the general distance described above.

Nevertheless, depending on the size of the display device, even if the angle θ is set to be a larger one, the frame may still be hardly sensible to the viewer as will be described later for the second embodiment. That range is defined by θ=25 degrees or less. That is why although a preferred range is defined by θ=20 degrees or less in the first embodiment, this is only an example and θ is suitably set to be equal to or smaller than 25 degrees in various other embodiments of the present invention.

In this description, the outer side surface 32S of the lateral housing portion 32 refers herein to every surface of the lateral housing portion 32 but its surface that faces the side surface of the display panel 10 (i.e., the inner side surface of the lateral housing portion 32). That is to say, an externally visible surface of the display device 100 is the outer side surface 32S of the lateral housing portion 32, which is supposed to include an outer side surface 32S1 and an end face 32S2 of the lateral housing portion 32 as shown in FIG. 3(b).

Figure 4:
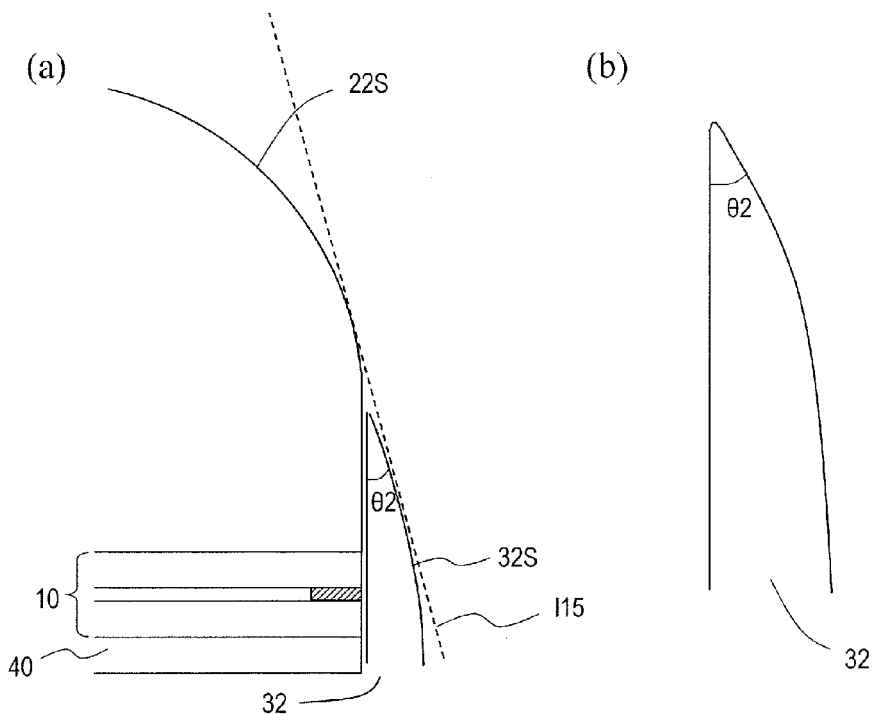
FIG. 4 (a) is a cross-sectional view illustrating, on a larger scale, the lateral housing portion and its surrounding portions of a display device according to a modified example of the first embodiment and (b) illustrates only the lateral housing portion.

FIGS. 4(a) and 4(b) illustrate a cross section of the lateral housing portion 32 according to a modified example of this embodiment.

This lateral housing portion 32 is arranged so that its principal surface defines an acute point angle θ 2 with respect to the lens-end perpendicular plane. The tip end (closer to the viewer) of the lateral housing portion 32 has a pointed shape.

This point angle θ 2 is suitably set to be approximately equal to the angle θ defining the viewing plane described above. In this case, the tip end of the lateral housing portion 32 is formed in such a shape that suits the blind spot space for the user.

By adopting this arrangement, part of the lateral housing portion 32 which is thicker than its tip end can be arranged at an appropriate position so as to face the side surface of the display panel 10 with the lateral housing portion 32 still kept hardly sensible to the viewer. As a result, a lateral housing portion 32 with a relatively high strength can be obtained. In addition, the lateral housing portion 32 can be easily arranged to project from the display panel 10 toward the light-transmitting cover 20, and therefore, can be secured to the light-transmitting cover 20 firmly.

The tip end of the lateral housing portion 32 does not have to be perfectly pointed but may be slightly rounded. To say the least, the principal surface of the outer side surface of the lateral housing portion 32 just needs to be tilted with respect to the lens-end perpendicular plane (or the panel's side surface).

Next, the thickness of the lateral housing portion 32 will be described. To function as housing, the lateral housing portion 32 suitably has a certain thickness or rigidity.

The present inventors carried out simulations to check out how thick the lateral housing portion 32 should be on the (horizontally) extended line of the liquid crystal layer 13. It should be noted that the thickness of the lateral housing portion 32 can be determined by the blind spot space described above but the size of that space varies with the thickness of the light-transmitting cover 20. And the thickness of the light-transmitting cover 20 is suitably selected appropriately according to the width of the frame. More specifically, the present inventors confirmed via experiments that the effective cover thickness (which is not the thickness of the light-transmitting cover 20 itself but a total thickness including the thicknesses of members located over the liquid crystal layer 13 such as the counter substrate 11 and optical film) should be 2.7 to 4.6 times as large as the frame width (if the refractive index of the cover material is close to 1.5 as in an acrylic resin, for example).

Figure 5:
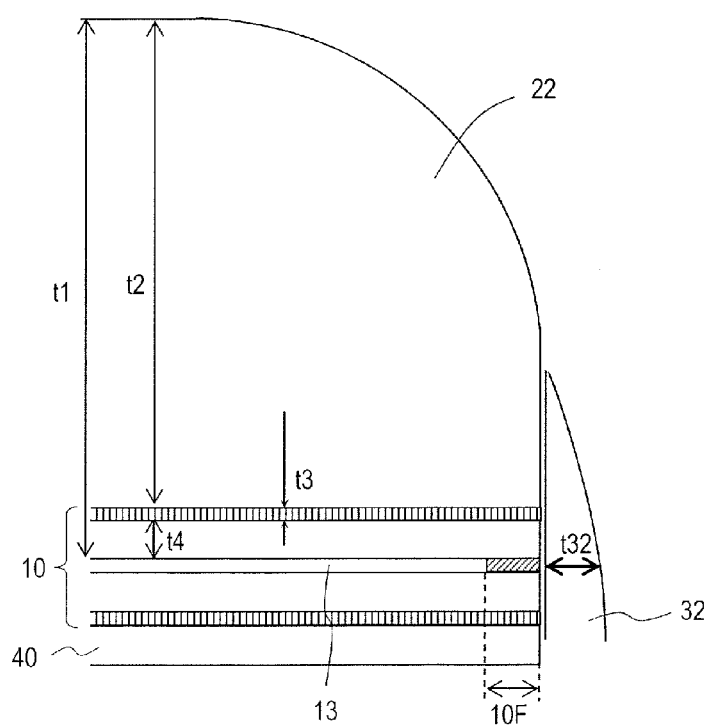
FIG. 5 A cross-sectional view illustrating, on a larger scale, an end portion of a display device according to the first embodiment and showing what the effective cover thickness is.
Figure 6:
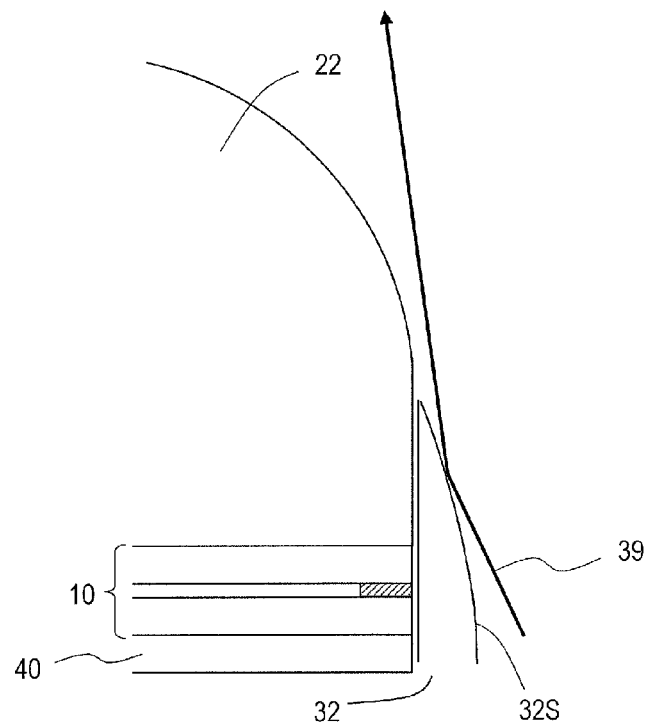
FIG. 6 Illustrates light reflected from the outer side surface of the lateral housing portion.

As shown in FIG. 5, in this description, the effective cover thickness t1 refers herein to the distance from the surface of the display medium (i.e., the liquid crystal layer 13) of the display panel 10 to the surface of the light-transmitting cover 20. That is to say, according to this embodiment, the effective cover thickness t1 is obtained by adding together the thickness t2 of the light-transmitting cover 20 itself and the distance from the surface of the liquid crystal layer 13 to the back surface of the light-transmitting cover 20 (i.e., the sum of the respective thicknesses t4 and t3 of the counter substrate 11 and optical film). A general optical film has a thickness t3 of about 0.1 mm and the counter substrate 11 has a thickness t4 of about 0.7 mm. Also, if an organic EL panel is used, the distance from the surface of the light-emitting element to the surface of the light-transmitting cover corresponds to the effective cover thickness t1.

To display an image appropriately on the frame area 10F, the effective cover thickness t1 is suitably appropriately selected according to the width of the frame area 10F (and is typically set to be 2.7 to 4.6 times as large as the frame width). As can be seen, a preferred range of the effective cover thickness t1 varies according to the frame width. But the horizontal thickness t32 of the lateral housing portion 32 (i.e., the thickness as measured at the same level as the liquid crystal layer 13) also varies with the effective cover thickness t1.

The following Table 2 shows the effective cover thickness (which is simply called "cover's thickness") t1 and the width of the display panel's frame area (which is simply called "panel's frame width") associated with that thickness t1. Table 2 also shows the maximum thicknesses t32 that the lateral housing portion 32 can have when the angles θ defined by the virtual viewing plane with respect to the panel normal are set to be 15, 18 and 20 degrees, respectively.

TABLE 2

| Cover's thickness t1 [mm] | Panel's frame width [mm] | Housing's thickness t32 [mm] | | |
|---|---|---|---|---|
| | | If θ = 15° | If θ = 18° | If θ = 20° |
| 1 | 0.2 to 0.4 | 0.1 | 0.2 | 0.2 |
| 2 | 0.4 to 0.7 | 0.3 | 0.3 | 0.4 |
| 3 | 0.7 to 1.1 | 0.4 | 0.5 | 0.5 |
| 4 | 0.9 to 1.5 | 0.5 | 0.6 | 0.7 |
| 5 | 1.1 to 1.9 | 0.7 | 0.8 | 0.9 |
| 6 | 1.3 to 2.2 | 0.8 | 1.0 | 1.1 |
| 7 | 1.5 to 2.6 | 0.9 | 1.1 | 1.3 |
| 8 | 1.7 to 3.0 | 1.1 | 1.3 | 1.5 |
| 9 | 2.0 to 3.3 | 1.2 | 1.5 | 1.6 |
| 10 | 2.2 to 3.7 | 1.3 | 1.6 | 1.8 |
| 11 | 2.4 to 4.1 | 1.5 | 1.8 | 2.0 |
| 12 | 2.6 to 4.4 | 1.6 | 1.9 | 2.2 |
| 13 | 2.8 to 4.8 | 1.7 | 2.1 | 2.4 |
| 14 | 3.0 to 5.2 | 1.9 | 2.3 | 2.5 |
| 15 | 3.3 to 5.6 | 2.0 | 2.4 | 2.7 |
| 16 | 3.5 to 5.9 | 2.1 | 2.6 | 2.9 |
| 17 | 3.7 to 6.3 | 2.3 | 2.8 | 3.1 |
| 18 | 3.9 to 6.7 | 2.4 | 2.9 | 3.3 |
| 19 | 4.1 to 7.0 | 2.5 | 3.1 | 3.5 |
| 20 | 4.3 to 7.4 | 2.7 | 3.2 | 3.6 |

As can be seen from Table 2, the greater the effective cover thickness t1, the larger the compatible frame width can be and the larger the thickness t32 of the lateral housing portion 32 can be set to be in the hardly visible space.

The present inventors carried out experiments on a display device with a screen size of 60 inches (product number: PN-V602 available from the applicant of the present application) to find a relation between the thickness of the lateral housing portion and the degree of visibility and a relation between the thickness of the lateral housing portion and the impact resistance of the display device. The results are as follows.

The display device used in the experiments had a panel's frame width of approximately 3.6 mm. According to the following Table 2, it can be seen that when the panel's frame width is approximately 3.6 mm, the effective cover thickness t1 suitably falls within the range of 10 mm to 16 mm. A situation where the effective cover thickness t1 is 10 mm and a situation where the effective cover thickness t1 is 16 mm will be described as an example. It should be noted that the color of the lateral housing portion (its outer side surface) is supposed to be black.

The frame visibility was rated in the following manner. Specifically, if the frame was invisible anywhere when the display device was viewed from a distance of 2.1 to 2.4 m in front of the display device, the invisibility was rated "◯". If the frame was invisible (or was visible but not to an annoying degree) depending on the position, the invisibility was rated "Δ". And if the frame was easily visible everywhere, the invisibility was rated "x". The impact strength was checked out by seeing if any display defect would occur when the lateral housing portion was struck with a hammer. The results are shown in the following Table 3:

TABLE 3

| Housing's thickness t32 [mm] | If cover's thickness t1 = 10 mm | | If cover's thickness t1 = 16 mm | |
|---|---|---|---|---|
| | Frame visibility | Impact strength | Frame visibility | Impact strength |
| 0.2 | ◯ | X | ◯ | X |
| 0.4 | ◯ | X | ◯ | X |
| 0.6 | ◯ | ◯ | ◯ | ◯ |
| 0.8 | ◯ | ◯ | ◯ | ◯ |
| 1.0 | ◯ | ◯ | ◯ | ◯ |
| 1.2 | ◯ | ◯ | ◯ | ◯ |
| 1.4 | Δ | ◯ | ◯ | ◯ |
| 1.6 | Δ | ◯ | ◯ | ◯ |
| 1.8 | Δ | ◯ | ◯ | ◯ |
| 2.0 | X | ◯ | ◯ | ◯ |
| 2.2 | X | ◯ | Δ | ◯ |
| 2.4 | X | ◯ | Δ | ◯ |
| 2.6 | X | ◯ | Δ | ◯ |
| 2.8 | X | ◯ | Δ | ◯ |
| 3.0 | X | ◯ | X | ◯ |
| 3.2 | X | ◯ | X | ◯ |
| 3.4 | X | ◯ | X | ◯ |

As can be seen from this Table 3, if the effective cover thickness t1 was 10 mm, the frame was not visible anywhere when the horizontal thickness t32 of the lateral housing portion (i.e., the housing's thickness) was equal to or smaller than 1.2 mm. When the housing's thickness t32 fell within the range of 1.4 mm to 1.8 mm, the frame was visible here and there but not to an annoying degree. But when the housing's thickness t32 was equal to or greater than 2.0 mm, the frame was visible relatively easily.

On the other hand, if the effective cover thickness t1 was 16 mm, the frame was not visible anywhere when the housing's thickness t32 was equal to or smaller than 2.0 mm. When the housing's thickness t32 fell within the range of 2.2 mm to 2.8 mm, the frame was visible here and there but not to an annoying degree. But when the housing's thickness t32 was equal to or greater than 3.0 mm, the frame was visible relatively easily.

As for the impact strength, when the housing's thickness t32 was equal to or smaller than 0.4 mm, defects sometimes occurred on the display screen irrespective of the effective cover thickness t1. Naturally, in an application that does not need impact strength, the housing's thickness t32 can be set to be equal to or smaller than 0.4 mm.

However, if the lateral housing portion 32 were too thin, the housing might be unable to function properly. For that reason, the thickness of the lateral housing portion 32 is suitably at least equal to 0.1 mm. For the same reason, at least a portion of the outer side surface 32S of the lateral housing portion 32 is suitably located outside of a plane which defines an angle θ of 1.8 degrees with respect to the panel normal and which contacts with the lens surface 22S. If the outer side surface 32S of the lateral housing portion 32 is located inside of the plane that is defined by this angle θ, the lateral housing portion 32 is too thin and should not be used.

As can be seen, if the outer side surface 32S of the lateral housing portion 32 is arranged in an appropriate space, the frame can be made hardly visible for the user with the display panel 10 protected appropriately. The display device of this embodiment includes the housing 30, and therefore, can prevent the display panel 10 from being exposed to dust or water. The display device can also protect the display panel 10 from directly applied impact.

Next, the outer side surface 32S of the lateral housing portion 32 will be described. To decrease the visibility of the lateral housing portion 32, the reflectance and color tone of the outer side surface 32S of the lateral housing portion 32 are suitably selected appropriately. Although an embodiment in which the lateral housing portion 32 is made of a material with no light-transmitting property will be described in the following description, the lateral housing portion 32 may also be made of a material with light-transmitting property.

First of all, as for the color tone of the outer side surface 32S of the lateral housing portion 32, an achromatic color is preferred. In this description, the "achromatic color" refers herein to the color white, the color black or a color grey with an arbitrary depth and is a color with a saturation of zero.

Next, as for the reflectance, the present inventors discovered that if the reflectance fell within the range of 30 to 70%, the frame was even less sensible for the user as can be seen from the following Table 4. In Table 4, a situation where the frame was invisible is indicated by ○, a situation where the frame was visible here and there but not to an annoying degree is indicated by Δ, and a situation where the frame was visible is indicated by x.

These results were obtained probably because if the reflectance fell within that range, then the outer side surface 32S of the lateral housing portion 32 would look adaptively to the surrounding environment due to reflection of light 39 from the outer side surface 32. And if the outer side surface 32S of the lateral housing portion 32 were too white or too black, then the outer side surface 32 would stand out against the surrounding environment and would be easily sensible as a frame. Also, the surface state of the outer side surface 32S may be either specular reflective or scattering. However, when the outer side surface 32S was a specular reflective surface, the frame was less sensible to a certain degree. The following Table 4 summarizes the results of experiments which were obtained when the outer side surface 32S was a scattering surface.

TABLE 4

| Reflectance | Frame visibility | | |
|---|---|---|---|
| | Housing's thickness: 1.0 mm | Housing's thickness: 1.5 mm | Housing's thickness: 2.0 mm |
| 0% (black) | ○ | Δ | X |
| 10% | ○ | Δ | X |
| 20% | ○ | Δ | X |
| 30% | ○ | ○ | Δ |
| 40% | ○ | ○ | Δ |
| 50% | ○ | ○ | Δ |
| 60% | ○ | ○ | Δ |
| 70% | ○ | ○ | Δ |
| 80% | ○ | Δ | X |
| 90% | ○ | Δ | X |
| 100% (white) | ○ | Δ | X |

Figure 7:
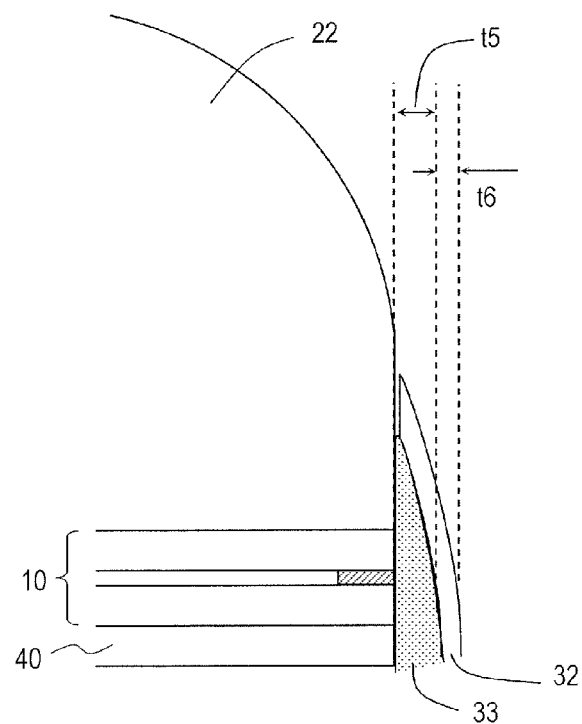
FIG. 7 A cross-sectional view illustrating, on a larger scale, the lateral housing portion and its surrounding portions of a display device as a modified example of the first embodiment.

Next, an embodiment in which a cushioning member 33 is arranged between the side surface of the display panel 10 and the lateral housing portion 32 will be described with reference to FIG. 7.

The material of the housing 30 (including the lateral housing portion 32 and the bottom housing portion 34) is suitably hard, because the housing 30 can have good impact resistance in that case. Specifically, the housing 30 is suitably made of a hard metallic material such as stainless steel, an aluminum alloy or a magnesium alloy rather than a resin material such as an acrylic resin or a polycarbonate resin.

The present inventors discovered that if a cushioning member 33 made of a relatively soft material was arranged between the lateral housing portion 32 and the side surface of the display panel 10, the impact resistance increased. The following Table 5 summarizes the results of an impact test which was carried out on a display device in which the cushioning member 33 was added to the configuration described above.

The cushioning member 33 is suitably made of a gel material with a high degree of cushioning ability. For example, the cushioning member 33 may be made of α Gel™ available from Taica Corporation or any of various urethane gels available from Exseal Co., Ltd.

The present inventors carried out experiments with the thickness t5 of the cushioning member 33 changed within the range of 0.05 mm to 0.3 mm as shown in the following Table 5. The lateral housing portion 32 was formed out of a magnesium alloy and the sum of the thickness t5 of the cushioning member 33 and the thickness t6 of the lateral housing portion 32 was set to be constant at 0.4 mm. As can be seen from Table 5, the present inventors confirmed that a cushioning member 33 with a thickness t5 of 0.1 mm or more should be used to decrease the impact strength.

TABLE 5

| Housing's thickness t6 [mm] | Cushioning's thickness t5 [mm] | Total thickness t5 + t6 [mm] | Impact strength |
|---|---|---|---|
| 0.4 | 0 | 0.4 | X |
| 0.35 | 0.05 | 0.4 | X |
| 0.3 | 0.1 | 0.4 | ○ |
| 0.25 | 0.15 | 0.4 | ○ |
| 0.2 | 0.2 | 0.4 | ○ |
| 0.15 | 0.25 | 0.4 | ○ |
| 0.1 | 0.3 | 0.4 | ○ |

As described above, in the display device of the first embodiment, its lens portion is arranged to face the frame area of the display panel of a stationary display device such as a TV monitor, and its lateral housing portion covering the panel's side surface is arranged at such a position where the user cannot sense the frame easily. As a result, an image can be presented to the user as if there were no frames with the display device protected appropriately.

(Embodiment 2)

A relatively small portable (handheld) display device for use as a mobile electronic device such as a smartphone or tablet PC will be described as a display device 200 according to a second embodiment. The display device of this embodiment typically includes a display panel with a diagonal size of at most 19 inches (more specifically, 15 inches or less) and is supposed to be used as a handheld device.

FIGS. 8(a) and 8(b) illustrate a configuration for a display device 200 according to this second embodiment. This display device 200 has the same basic configuration as the display device 100 of the first embodiment. Thus, any component also included in the display device 100 and having substantially the same function as its counterpart is identified by the same reference numeral as its counterpart's and description thereof will be omitted herein.

In this display device 200, a manipulating touchscreen panel 50 is arranged between the display panel 10 and the light-transmitting cover 20 as shown in FIG. 8(b). Also, hard keys 54 are arranged around the display screen 28 as shown in FIG. 8(a).

In the example illustrated in FIG. 8(b), an out-cell type touchscreen panel 50 is arranged closer to the viewer than the display panel 10 is. Alternatively, the touchscreen panel 50 may be naturally replaced with an on-cell type or in-cell type touchscreen panel. When an in-cell type touchscreen panel is used, a touchscreen panel structure is formed inside the display panel 10.

Also, behind the backlight 40, arranged are a circuit board and battery to drive the display device 200 (which will be hereinafter referred to as a "battery section 52" collectively). In the embodiment illustrated in FIG. 8, the bottom housing portion 34 of the housing 30 is arranged as an outermost part at the rear of the display device 200 to house the battery section 52. However, this is just an example and this configuration does not always have to be adopted. Alternatively, the bottom housing portion 34 may be housed in another housing outside of the housing 30 that houses the display panel 10 and the backlight 40 and may be secured and connected to the housing 30 there.

Since the display device 200 of this embodiment is used while being held in the user's hand, the distance from this display device to his or her eyes is not supposed to be determined based on an appropriate viewing distance as in the first embodiment but is supposed to be determined by the position where the user can easily hold the display device in his or her hand. In addition, since the size of the display panel 10 is relatively small, the influence of the interval between the user's retinas is non-negligible, which is another difference from the display device 100 of the first embodiment.

Now, it will be described where the lateral housing portion 32 is arranged in this display device 200.

The present inventors confirmed via experiments that if the frame was invisible to at least one of the viewer's eyes on one of the right- and left-hand sides of this display device while this display device 200 was used, he or she felt as if there were no frames. In general, when a mobile electronic device such as a smartphone is used while being held in the hand, the viewing distance often falls within the range of 160 to 300 mm.

In this case, suppose the screen size W is 55 mm and the interval between the pupils (i.e., the interval between the respective centers of the right and left eyes ER and EL) is 64 mm (which is the average among Japanese males) as shown in FIG. 9(a). If the viewing distance is 160 mm, the angle θ defining the virtual viewing plane described above is 20.4 degrees. On the other hand, if the viewing distance is 300 mm, θ=11.2.

The following Table 6 summarizes the relation between the viewing distance and the angle θ defined by the virtual viewing plane (i.e., the viewing angle).

TABLE 6

| Viewing distance [mm] | Viewing angle [degrees] |
|---|---|
| 100 | 30.8 |
| 120 | 26.4 |
| 140 | 23.0 |
| 160 | 20.4 |
| 180 | 18.3 |
| 200 | 16.6 |
| 220 | 15.1 |
| 240 | 13.9 |
| 260 | 12.9 |
| 280 | 12.0 |
| 300 | 11.2 |
| 320 | 10.5 |
| 340 | 9.9 |
| 360 | 9.4 |
| 380 | 8.9 |
| 400 | 8.5 |

Thus, supposing the viewing distance falls within the range of 160 mm to 300 mm, in the display device 200 of such a size, the lateral housing portion 32 may be arranged so as not to go over any of the tangents 111.2 to 120.4 which contact with the lens surface 22S of the lens portion 22 of the light-transmitting cover 20 and which define a tilt angle of 11.2 to 20.4 degrees as shown in FIG. 9(b). As a result, the right or left frame becomes no longer visible to at least one of the right and left eyes, and the user of this device can feel as if there were frames there.

As can be seen from the foregoing description, the angular range of the angle θ defining a plane that indicates the outermost position of the outer side surface 32S of the lateral housing portion 32 is suitably at most 20.4 degrees and most suitably 11.2 degrees or less. Nevertheless, the present inventors confirmed that if θ was equal to or smaller than approximately 25 degrees, the frames would be barely sensible to the viewer but not to an annoying degree. That is why in the display device 200 of this embodiment, a preferred range of the angle θ is equal to or smaller than approximately 25 degrees but more than 0 degrees.

That is to say, according to this embodiment, the outer side surface 32S of the lateral housing portion 32 is located in the space between a plane 94 which contacts with the outer end face 22E of the lens portion 22 and which is parallel to the panel normal and the plane 92 that defines an acute angle θ of 25 degrees or less with respect to the panel normal 10n and that contacts with the lens surface 22S (i.e., the virtual viewing plane or the second plane). Contrarily, if the outer side surface 32S of the lateral housing portion were located outside of the virtual viewing plane 92 defined by θ=25 degrees (i.e., the plane defined by the tangent 125), then part of the lateral housing portion 32 would be sensible as a frame to an annoying degree to the user who is viewing from the general distance described above.

More generally, however, the position of the lateral housing portion can be set according to the width W1 of the display device as will be described specifically below.

Figure 10:
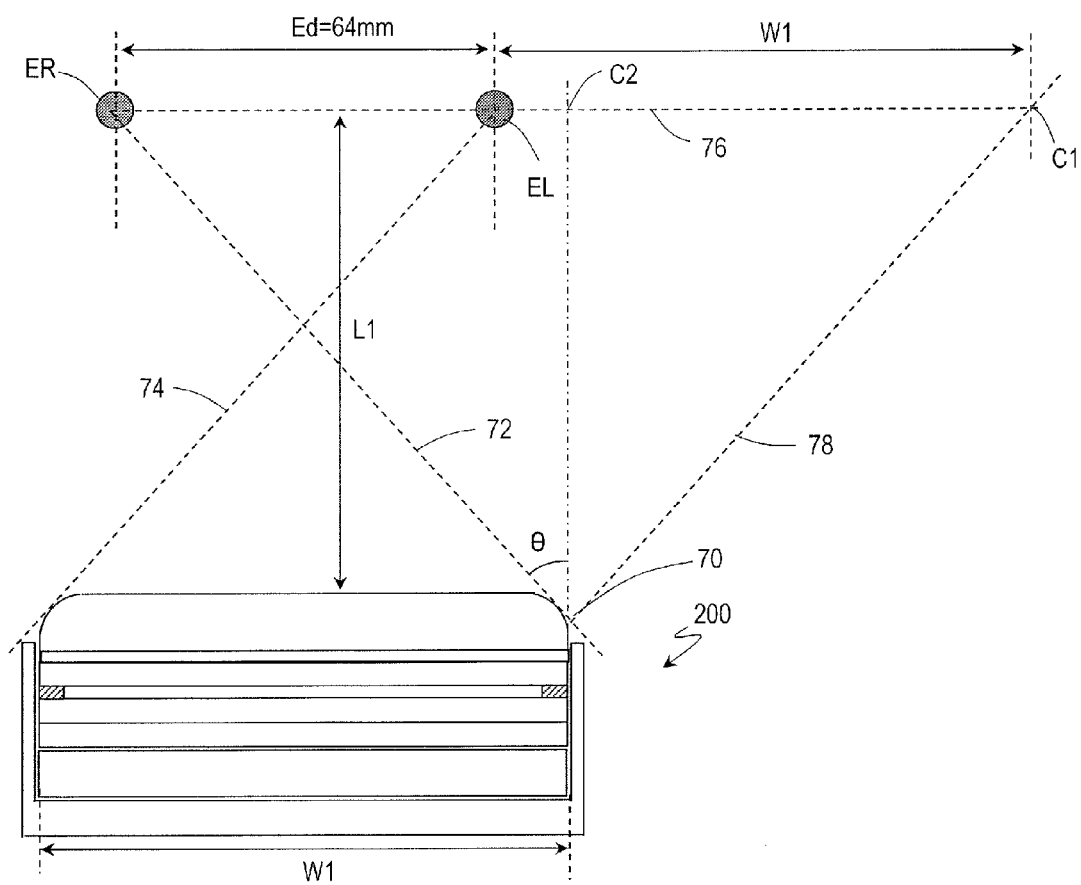
FIG. 10 An overall view showing the relative position of the user with respect to the display device.

FIG. 10 shows the relative positions of the user's right and left eyes ER and EL with respect to the display device 200 as in FIG. 9(a). As shown in FIG. 10, one line of sight (virtual viewing plane) 72 is defined as a line drawn from his or her right eye ER toward the left-end contact point 70 of the display device 200. On the other hand, the other line of sight (virtual viewing plane) 74 is defined as a line drawn from his or her left eye EL toward the right-end contact point of the display device 200.

In such an arrangement, a line 78 which is parallel to the other line of sight 74 and which passes through the left-end contact point 70 is drawn. And the point at which that line 78 intersects with a line 76 that passes through the right and left eyes ER and EL is supposed to be an intersection C1. In that case, an isosceles triangle, one of the vertices of which is defined by the contact point 70 and which connects together the contact point 70, the right eye ER and the intersection C1, is defined. The length of this isosceles triangle's base ER–C1 is given by 64+W1 (mm).

Also, a perpendicular bisector is drawn from the contact point 70 toward the base ER–C1 (i.e., a panel screen normal passing through the contact point 70 is drawn) and the point at which the perpendicular bisector intersects with the base ER–C1 is supposed to be an intersection C2. The angle θ formed between this perpendicular bisector and the line of sight 72 is the angle that defines the direction of the line of sight 72. Also, the length of this perpendicular bisector defines the viewing distance L1.

In this case, considering a right triangle (with a vertical angle θ) which connects the contact point 70, the right eye ER and the intersection C2 together, it can be seen that tan θ=(64+W1) /2L1 is satisfied.

Thus, supposing the display panel's width is W1 (mm), the condition to be suitably satisfied to make the frame hardly visible is that the outer side surface of the lateral housing portion be located inside the acute angle θ represented by θ=arc tan ((64+W1) /2L1). In this case, since the distance during an ordinary use satisfies 160≤L1≤300 in this embodiment, the θ range is suitably set so that the condition 160≤L1≤300 is satisfied in the equation described above. Also, supposing the interval between the right and left eyes ER and EL is Ed (where 56≤Ed≤75), the equation described above can be rewritten into θ=arc tan ((Ed+W1) /2L1).

Next, the thickness of the lateral housing portion 32 will be described. To function as housing 30, the lateral housing portion 32 suitably has a certain thickness or rigidity. As in the first embodiment, the present inventors also carried out simulations in this embodiment to check out how thick the lateral housing portion 32 should be on the (horizontally) extended line of the liquid crystal layer 13.

Figure 11:
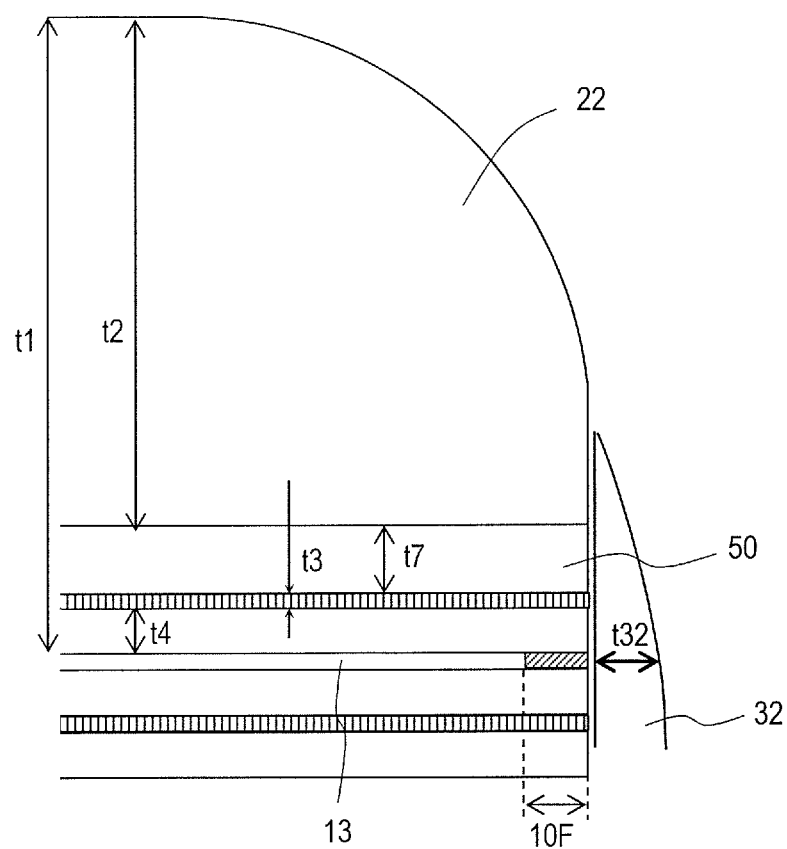
FIG. 11 A cross-sectional view illustrating, on a larger scale, an end portion of a display device according to the second embodiment and showing what the effective cover thickness is.

As described above, the effective cover thickness t1 shown in FIG. 11 is suitably 2.7 to 4.6 times as large as the frame width (if the refractive index of the cover material is close to 1.5 as in an acrylic resin, for example). In this embodiment, the effective cover thickness t1 is obtained by adding together the thickness t2 of the light-transmitting cover 20 itself and the respective thicknesses t4, t3 and t7 of the counter substrate 11, the optical film and the touchscreen panel. A general optical film has a thickness t3 of about 0.1 mm, the counter substrate has a thickness t4 of about 0.3 mm, and the touchscreen panel 50 has a thickness t7 of about 0.5 mm.

The following Table 7 shows the effective cover thickness (which is simply called "cover's thickness") t1 and the width of the display panel's frame area (which is simply called "panel's frame width") associated with that thickness t1. Table 7 also shows the maximum thicknesses t32 that the lateral housing portion 32 can have when the angles θ defined by the virtual viewing plane with respect to the panel normal are set to be 11.2, 20.4 and 25 degrees, respectively.

TABLE 7

| Cover's thickness t1 [mm] | Panel's frame width [mm] | Housing's thickness t32 [mm] | | |
|---|---|---|---|---|
| | | If θ = 11.2° | If θ = 20.4° | If θ = 25° |
| 1 | 0.2 to 0.4 | 0.10 | 0.19 | 0.23 |
| 1.5 | 0.3 to 0.6 | 0.15 | 0.28 | 0.35 |
| 2 | 0.4 to 0.7 | 0.20 | 0.37 | 0.47 |
| 2.5 | 0.5 to 0.9 | 0.25 | 0.46 | 0.58 |
| 3 | 0.7 to 1.1 | 0.30 | 0.56 | 0.70 |
| 3.5 | 0.8 to 1.3 | 0.35 | 0.65 | 0.82 |
| 4 | 0.9 to 1.5 | 0.40 | 0.74 | 0.93 |
| 4.5 | 1.0 to 1.7 | 0.45 | 0.84 | 1.05 |
| 5 | 1.1 to 1.9 | 0.50 | 0.93 | 1.17 |

The present inventors carried out experiments on a display device (liquid crystal module) with a screen size of 4.5 inches for use in a smartphone to find a relation between the thickness of the lateral housing portion and the degree of visibility and a relation between the thickness of the lateral housing portion and the impact resistance of the display device. The results are as follows.

The display device used in the experiments had a panel's frame width of approximately 1.0 mm. According to the following Table 7, it can be seen that when the panel's frame width is approximately 1.0 mm, the effective cover thickness t1 suitably falls within the range of 3 mm to 4.5 mm. A situation where the effective cover thickness t1 is 3 mm and a situation where the effective cover thickness t1 is 4.5 mm will be described as an example. It should be noted that the color of the lateral housing portion (its outer side surface) is supposed to be black.

The frame visibility was rated in the following manner. Specifically, if the frame was invisible anywhere when the display device was held at a distance of 160 to 300 mm from the user's face, the invisibility was rated "◯". If the frame was invisible (or was visible but not to an annoying degree) depending on the position, the invisibility was rated "Δ". And if the frame was easily visible everywhere, the invisibility was rated "x". The impact strength was checked out by seeing if any display defect would occur when the display device was dropped from a height of 1 m. The results are shown in the following Table 8:

TABLE 8

| Housing's thickness t32 [mm] | If cover's thickness is 3 mm | | If cover's thickness is 4.5 mm | |
|---|---|---|---|---|
| | Frame visibility | Impact strength | Frame visibility | Impact strength |
| 0.1 | ◯ | X | ◯ | X |
| 0.2 | ◯ | X | ◯ | X |
| 0.3 | ◯ | ◯ | ◯ | ◯ |
| 0.4 | Δ | ◯ | ◯ | ◯ |
| 0.5 | Δ | ◯ | Δ | ◯ |
| 0.6 | Δ | ◯ | Δ | ◯ |
| 0.7 | Δ | ◯ | Δ | ◯ |
| 0.8 | X | ◯ | Δ | ◯ |
| 0.9 | X | ◯ | Δ | ◯ |
| 1.0 | X | ◯ | Δ | ◯ |
| 1.1 | X | ◯ | X | ◯ |
| 1.2 | X | ◯ | X | ◯ |
| 1.3 | X | ◯ | X | ◯ |
| 1.4 | X | ◯ | X | ◯ |
| 1.5 | X | ◯ | X | ◯ |

As can be seen from this Table 8, if the effective cover thickness t1 was 3 mm, the frame was not visible anywhere when the horizontal thickness t32 of the lateral housing portion (i.e., the housing's thickness) was equal to or smaller than 0.3 mm. When the housing's thickness t32 fell within the range of 0.4 mm to 0.7 mm, the frame was visible here and there but not to an annoying degree. But when the housing's thickness t32 was equal to or greater than 0.8 mm, the frame was visible relatively easily.

On the other hand, if the effective cover thickness t1 was 4.5 mm, the frame was not visible anywhere when the housing's thickness t32 equal to or smaller than 0.4 mm. When the housing's thickness t32 fell within the range of 0.5 mm to 1.0 mm, the frame was visible here and there but not to an annoying degree. But when the housing's thickness t32 was equal to or greater than 1.1 mm, the frame was visible relatively easily.

As for the impact strength, when the housing's thickness t32 was equal to or smaller than 0.2 mm, defects sometimes occurred on the display screen irrespective of the cover's thickness t1. Naturally, in an application that does not need impact strength, the housing's thickness t32 can be set to be equal to or smaller than 0.2 mm.

However, if the lateral housing portion 32 were too thin, the housing 30 might be unable to function properly. For that reason, the thickness of the lateral housing portion 32 is suitably at least equal to 0.1 mm. For the same reason, the outer side surface 32S of the lateral housing portion 32 is suitably located outside of a plane which defines an angle θ of 6.2 degrees with respect to the panel normal and which contacts with the lens surface. If the outer side surface 32S of the lateral housing portion 32 is located inside of the plane that is defined by this angle θ, the lateral housing portion 32 is too thin and should not be used.

As described above, in the display device of the second embodiment, its lens portion is arranged to face the frame of a portable display device such as a smartphone, and its lateral housing portion covering the panel's side surface is arranged at such a position where the user cannot sense the frame easily. As a result, an image can be presented to the user as if there were no frames with the display device protected appropriately.

It should be noted that the frame may be narrow on the upper side and the right and left sides of the display device 200 but may be broad on the lower side as shown in FIG. 8(a) because the hard keys 54 need to be arranged on the lower side. In that case, in the area where the hard keys 54 are arranged, the display area is not expanded to the periphery of the display device and the frame does not have to be made hardly visible there. That is why the light-transmitting cover 20 provided for the display device 200 may have a lens portion 22 with a curved surface to face the narrow frame on those three sides but may have no lens portion to face the frame on the lower side. Naturally, when required by consideration of design, the light-transmitting cover may also be provided to cover the display device to the bottom of the lower side and a curved surface may be arranged along the lower side. Also, the lateral housing portion 32 may be arranged at such a position where the viewer cannot sense the frame easily only on the three sides with the narrow frame.

Although the display device described above is supposed to have a rectangular planar shape, the present invention is also applicable to display devices with various other planar shapes such as circular, elliptical and polygonal planar shapes.

INDUSTRIAL APPLICABILITY

The present invention can be used extensively in various kinds of display devices including a TV set and a smartphone.

REFERENCE SIGNS LIST 10 display panel
20 light-transmitting cover
22 lens portion
24 flat plate portion
30 housing
32 lateral housing portion
34 bottom housing portion
40 backlight
92 virtual viewing plane (second plane)
94 lens-end perpendicular plane (first plane)
100, 200 display device

The invention claimed is:

1. A display device comprising:
a display panel having a display area and a frame area which is provided outside of the display area;
a light-transmitting cover which is arranged closer to a viewer than the display panel is and which includes a lens portion that is arranged at a position corresponding to the boundary between the frame area and the display area of the display panel; and
a housing including a lateral housing portion which is arranged to face the display panel's side surface,
wherein the outer side surface of the lateral housing portion is located in a space between a first plane which is parallel to a normal to the display panel's screen surface and which contacts with the outer end face of the lens portion of the light-transmitting cover and a second plane which defines an acute angle θ of 25 degrees or less with respect to the normal to the display panel's screen surface and which contacts with the surface of the lens portion.

2. The display device of claim 1, wherein the display panel has a diagonal size of 19 inches or less and the acute angle θ is equal to or smaller than 20.4 degrees.

3. The display device of claim 2, wherein the acute angle θ is equal to or smaller than 11.2 degrees.

4. The display device of claim 1, wherein the display panel has a diagonal size of 19 inches or more and the acute angle θ is equal to or smaller than 20 degrees.

5. The display device of claim 4, wherein the acute angle θ is equal to or smaller than 18 degrees.

6. The display device of claim 5, wherein the acute angle θ is equal to or smaller than 15 degrees.

7. The display device of claim 1, wherein the acute angle θ is equal to or larger than 1.8 degrees.

8. The display device of claim 1, wherein the lateral housing portion has a thickness of 0.1 mm or more.

9. The display device of claim 1, wherein the distance from the surface of a display medium of the display panel to the surface of the light-transmitting cover is set to be 2.7 to 4.6 times as large as the width of the frame area.

10. The display device of claim 1, wherein the principal surface of the outer side surface of the lateral housing portion is formed to define an acute point angle θ2 with respect to the first plane and the point angle θ2 is equal to or smaller than 25 degrees.

11. The display device of claim 1, wherein the outer side surface of the lateral housing portion has a reflectance of 30% to 70%.

12. The display device of claim 1, wherein the outer side surface of the lateral housing portion has an achromatic color.

13. The display device of claim 1, further comprising a cushioning member which is provided between the outer side surface of the lateral housing portion and the side surface of the display panel.

14. The display device of claim 13, wherein the cushioning member is made of a gel material.

15. A display device comprising:
- a display panel having a display area and a frame area which is provided outside of the display area;
- a light-transmitting cover which is arranged closer to a viewer than the display panel is and which includes a lens portion that is arranged at a position corresponding to the boundary between the frame area and the display area of the display panel; and
- a housing including a lateral housing portion which is arranged to face the display panel's side surface,
- wherein the outer side surface of the lateral housing portion is located in a space between a first plane which is parallel to a normal to the display panel's screen surface and which contacts with the outer end face of the lens portion of the light-transmitting cover and a second plane which defines an acute angle θ with respect to the normal to the display panel's screen surface and which contacts with the surface of the lens portion, and
- if the width of the display panel is W1 mm, with Ed representing an interval between right and left eyes of a viewer and satisfying 56 mm≤Ed≤75 mm, and with L representing a viewing distance and satisfying 160 mm≤L≤300 mm, the acute angle θ satisfies the following equation:

$$\theta = \arctan((Ed+W1)/2L1)$$

* * * * *